(12) United States Patent
Tetzlaff et al.

(10) Patent No.: US 8,461,484 B2
(45) Date of Patent: Jun. 11, 2013

(54) CONDUCTIVE STUD WELDING

(75) Inventors: Burkhard Tetzlaff, Duisburg (DE); Marco Queller, Voerde (DE); Peter Ohse, Duisburg (DE); Achim Bandorski, Oberhausen (DE)

(73) Assignee: ThyssenKrupp Steel AG, Duisburg (DE)

( * ) Notice: Subject to any disclaimer, the term of this patent is extended or adjusted under 35 U.S.C. 154(b) by 716 days.

(21) Appl. No.: 12/540,900

(22) Filed: Aug. 13, 2009

(65) Prior Publication Data

US 2010/0084380 A1    Apr. 8, 2010

(30) Foreign Application Priority Data

Aug. 19, 2008 (DE) .................. 10 2008 044 451

(51) Int. Cl.
*B23K 5/00* (2006.01)

(52) U.S. Cl.
USPC ............................ 219/137 PS; 219/137 WM

(58) Field of Classification Search
USPC ................ 219/74, 93, 104, 137 PS, 137 WM
See application file for complete search history.

(56) References Cited

U.S. PATENT DOCUMENTS

| 4,566,924 A * | 1/1986 | Hara et al. ................... 156/73.5 |
| 4,636,124 A * | 1/1987 | Gugle et al. ................. 411/82.3 |
| 4,855,562 A | 8/1989 | Hinden |
| 4,912,299 A * | 3/1990 | Oros et al. .............. 219/137 PS |
| 5,820,323 A * | 10/1998 | Barandun ..................... 411/171 |
| 7,645,105 B2 * | 1/2010 | Hengel et al. ................. 411/171 |
| 8,047,740 B2 * | 11/2011 | Christ ........................... 403/270 |
| 8,092,130 B2 * | 1/2012 | Christ ........................... 411/171 |
| 2007/0295698 A1 * | 12/2007 | Hengel et al. ................... 219/93 |
| 2008/0101857 A1 * | 5/2008 | Christ ........................... 403/272 |
| 2008/0135529 A1 * | 6/2008 | Kuchuk-Yatsenko et al. ............................ 219/104 |

FOREIGN PATENT DOCUMENTS

| DE | 85496 | 10/1971 |
| DE | 19729968 C | 4/1999 |
| DE | 10 2006 013 529 | 10/2006 |
| JP | 60152378 A * | 8/1985 |
| JP | 01154876 A1 | 6/1989 |
| JP | H 01-154876 | 6/1989 |
| JP | 06277854 A * | 10/1994 |

* cited by examiner

*Primary Examiner* — Michael Lebentritt
(74) *Attorney, Agent, or Firm* — Proskauer Rose LLP

(57) ABSTRACT

A method for welding a first workpiece with a joining element, wherein the joining element and the first workpiece consist at least partially of a metal, includes moving the joining element relative to the first workpiece during welding and at the same time pressing the joining element against the first workpiece. This method for welding a joining element with a material permits a reliable firmly-bonded connection between joining element and workpiece, when the workpiece consists of a composite material or has low rigidity, and is achieved by generating an electrical current between workpiece and joining element during mechanical contact of the joining element with the first workpiece.

14 Claims, 2 Drawing Sheets

CONDUCTIVE STUD WELDING

CROSS-REFERENCE TO RELATED APPLICATION

This application claims the benefit of and priority to German patent application no. DE 10 2008 044 451.0-34, filed on Aug. 19, 2008. The disclosure of the above application is incorporated herein by reference in its entirety.

FIELD OF THE INVENTION

The invention relates to a method for welding a first workpiece with a joining element, wherein the joining element and the first workpiece consist at least partly of a metal, the joining element is moved relative to the first workpiece during welding and at the same time is pressed against the first workpiece. Furthermore the invention relates to an advantageous use of the method.

BACKGROUND

A method for welding a workpiece with a joining element is for example stud arc welding. Stud arc welding is one of the arc press welding methods, in which an arc is ignited between a front face of the stud as the joining element and the workpiece, both parts of which, the stud and the workpiece, are locally melted and then stud and workpiece are joined under relatively low contact pressure. Stud arc welding however is problematic when welding sandwich sheets, which for example exhibit two outside layers of metal and a plastic layer lying inside. When corresponding sandwich sheets are joined by stud arc welding, instabilities in the process arise again and again due to the plastic layer, so that the arc can break down. Furthermore only one connection between stud and metal sheet facing the stud develops, as the result of which if the joint is subject to higher stresses delamination of the sandwich sheet can occur in the vicinity of the joints. A method for stud arc welding of composite sheets is disclosed for example by the Japanese Patent Application JP 01154876 A. Furthermore German Patent Application DE 10 2006 013 529 discloses a method for welding a sandwich component using a friction stud, wherein the friction stud is moved not only rotationally but also translationally at the same time, and due to the frictional heat generated is welded with the sandwich component. Particularly in the case of sandwich components, which have small metal thicknesses or low rigidity, the latter method is to be regarded however as problematic.

SUMMARY OF THE INVENTION

In general, an aspect of the present invention is to provide a method for welding a joining element with a material, which permits a reliable firmly-bonded connection between joining element and workpiece, when the workpiece consists of a composite material or has low rigidity.

In accordance with first teaching of the present invention the aspect indicated above is achieved in that during the mechanical contact of the joining element with the first workpiece an electrical current is generated between workpiece and joining element.

In contrast to stud arc welding, in the case of the method according to the invention the current is induced during the mechanical contact between the joining element and the workpiece, so that no arc is produced. Nevertheless if the amperage is sufficient the current causes additional heating and reduction of the yield strength of the material, so that the joining element can penetrate the material. The penetration of the joining element into the metallic material is reliably assisted by the conductive current without problematic instabilities in the process arising when plastic is present. With the combination of friction welding and resistance welding therefore it was possible to produce very good firmly-bonded connections between the joining element and a workpiece.

In accordance with a first embodiment of the method according to the invention the joining element rotates, wherein the joining element is pressed in the axial direction against the first workpiece. Frictional heat can be simply generated in a workpiece at a concentrated point on the joining element by rotating the joining element and simultaneous exertion of pressure. Furthermore the rotating joining element can be easily pressed into the workpiece.

If the joining element, in accordance with another embodiment of the method according to the invention, does not completely penetrate the first workpiece, thin-walled workpieces can also be welded well with the joining element.

In accordance with a further embodiment of the method according to the invention the first workpiece consists of a composite material with at least two different layers of material. As already stated, the method according to the invention in particular also ensures reliability of the process if one material layer of the composite material consists of plastic, since in the case of the method according to the invention the current flow can only be caused to flow for example when the joining element meets the metallic material layer of the workpiece. Hence, no unstable arc arises and reliability of the process is assured despite the presence of a plastic layer.

The method according to the invention can therefore also be configured advantageously in that the first workpiece exhibits two outer layers of metal and at least one internal plastic layer. These sandwich components can be joined particularly reliably with the method according to the invention, since the current flow is induced, for example on the one hand due to mechanical contact with the first outer layer of metal and on the other hand when the second outer layer of metal is reached, for assisting the friction welding specifically for penetrating the first layer of metallic material or for producing a joining zone in the second layer of material, respectively.

It has been shown in accordance with another embodiment that it is advantageous to use electric current pulses of more than 10 A, preferably between 100 A and 2500 A. With these amperages it was possible to achieve good weld connections.

Preferably the rotational speed of a rotating joining element is between 150 and 25000, preferably between 400 and 5000 rpm. With said rotational speeds above all homogenization of the contact conditions can be achieved, which may result in reduction of the necessary contact pressure. As a result, sheets with lower rigidity can also be perfectly welded even with access from only one side.

Furthermore, by utilizing a method according to an embodiment of the invention good results in relation to the joint quality between joining element and first workpiece are obtained due to the fact that the duration of the current pulses is between 10 ms and 2500 ms, preferably between 500 ms and 1000 ms.

In order to assist the welding or, in the case of a sandwich component for example, the penetration of a first layer of metal of a composite material, at least one current pulse is induced simultaneously with a movement of the joining element towards the first workpiece. Preferably at least one current pulse is induced immediately before the friction movement of the joining element relative to the first workpiece stops, so that in combination between friction heat and conductively generated heat, the metal is melted and solidifies when the friction movement or the rotation ceases, so that a firmly-bonded connection between the first workpiece and the joining element can be produced.

Particularly good results as regards the connection of the joining element with the first workpiece are obtained due to the fact that a stud with a truncated conical point is, in one embodiment, used as the joining element. A truncated conical point on the one hand has an easy-to-handle support point of the joining element, namely the truncated cone point. On the other hand, during penetration by the joining element, the conical lateral face produces an electrical contact so long as, when a layer of metal is penetrated, in addition conductive heat is generated. However, other geometries deviating from the truncated conical point are conceivable, for example a spherical-shaped point of the stud.

If the point of the truncated conical stud comprises an angle of 30° to 90°, preferably 60°, in accordance with a further embodiment of the method according to the invention, penetration into the first workpiece is facilitated.

The method according to the invention can be advantageously configured further due to the fact that a second workpiece is connected to the first workpiece by at least one joining element. Thereby it is also possible to simply connect two workpieces together by means of a joining element when the weld joint is difficult to access, even if one of the workpieces, for example the first workpiece, is a composite material in the form of a sandwich component. As already stated above, for this purpose the first workpiece does not necessarily have to be accessible from both sides and, due to the reduced contact pressure necessary for the joining element, also does not have to have very high rigidity.

According to a second teaching of the present invention the aspect indicated above is achieved in that the method according to the invention is used for attaching components of a motor vehicle, particularly for attaching body parts. In automotive construction, in order to reduce the weight of the motor vehicles, composite materials are being increasingly used. These partially comprise plastic layers and can therefore only be welded with relative difficulty. Particularly if accessibility is poor, a first workpiece consisting of a composite material, especially a sandwich component, can be connected by means of a firmly-bond to a second workpiece in a reliable way by using the method according to the invention.

BRIEF DESCRIPTION OF THE DRAWINGS

A plurality of embodiments of the method according to the invention as well as the use of the method according to the invention exist. Reference is made to the description of two exemplary embodiments in connection with the drawings. In the drawings.

DESCRIPTION

Figure 1:
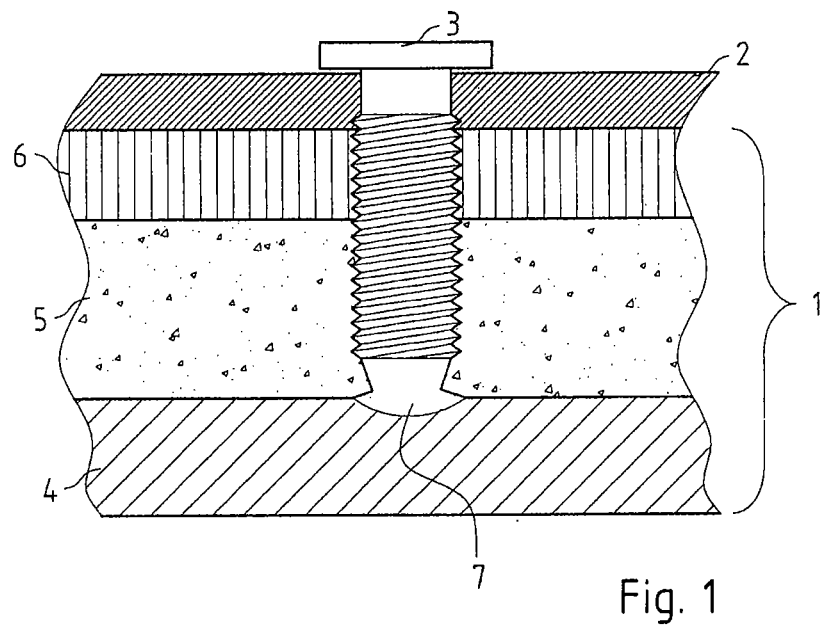
FIG. 1 shows a schematic cutaway view of a connection of two workpieces produced with a first exemplary embodiment of the method according to the invention.

Firstly, FIG. 1 shows a typical application of the method according to the invention, wherein a first workpiece 1 is joined to a second workpiece 2 by means of joining element 3. The workpiece 1 consists of an outer layer of metal 4, for example steel, a plastic layer 5 and a further outer layer of metal 6, which likewise consists of a steel alloy. In addition, however, any other metal materials, which are weldable in principle, can be used. In this case neither the outer layers of metal 4, 6 nor the plastic layer 5 are drawn to scale. More particularly, said layers 4, 5, 6 of the first workpiece 1 may be of a different thickness.

When the connection between both workpieces 1 and 2 is produced the joining element 3 must firstly penetrate the workpiece 2 and then the layers 6 and 5 of the workpiece 1. Normally the thickness of the layer of metal 6 is often small, so that the layer of metal 6 can be penetrated relatively easily. According to this exemplary embodiment of the method according to the invention, during joining of the joining element 3, at first current is induced into the workpiece 1 on contact with the metallic layer 6 of the workpiece 1. At the contact point between joining element 3 and the layer 6 of the workpiece 1, beside the friction of the rotating joining element 3, now additionally heat is generated, which facilitates penetration of the joining element 3 through the layer 6 of the workpiece 1.

Subsequently the joining element is pressed through the plastic layer 5 and on reaching the metallic layer 4 a current pulse is again induced into the workpiece 1 across the joining element 3. As is evident in FIG. 1, the joining element 3 is connected to the metallic layer 4 via a joining zone 7. As already described above, the reliability of the method according to the invention is particularly high since, in contrast to stud arc welding commonly used, no arc is needed in order to generate additional heat in the workpiece to be connected.

Figure 2:
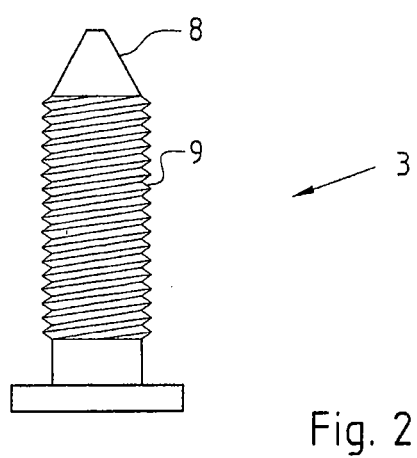
FIG. 2 shows in a schematic lateral view an exemplary embodiment of a joining element used in the form of a stud and FIG. 3 in diagrams schematically shows the temporal sequence of a further exemplary embodiment of the method according to the invention.

FIG. 2 now shows a joining element 3, as can be used according to an exemplary embodiment of the method according to the invention. The joining element 3 is a stud with a rotationally symmetrical core, exhibiting a truncated conical point 8, which has an angle of between 30° and 90°, preferably 60°. In addition, a thread 9 can be provided for better interlocking of the joining element with the plastic layer present in the composite material.

Figure 3:
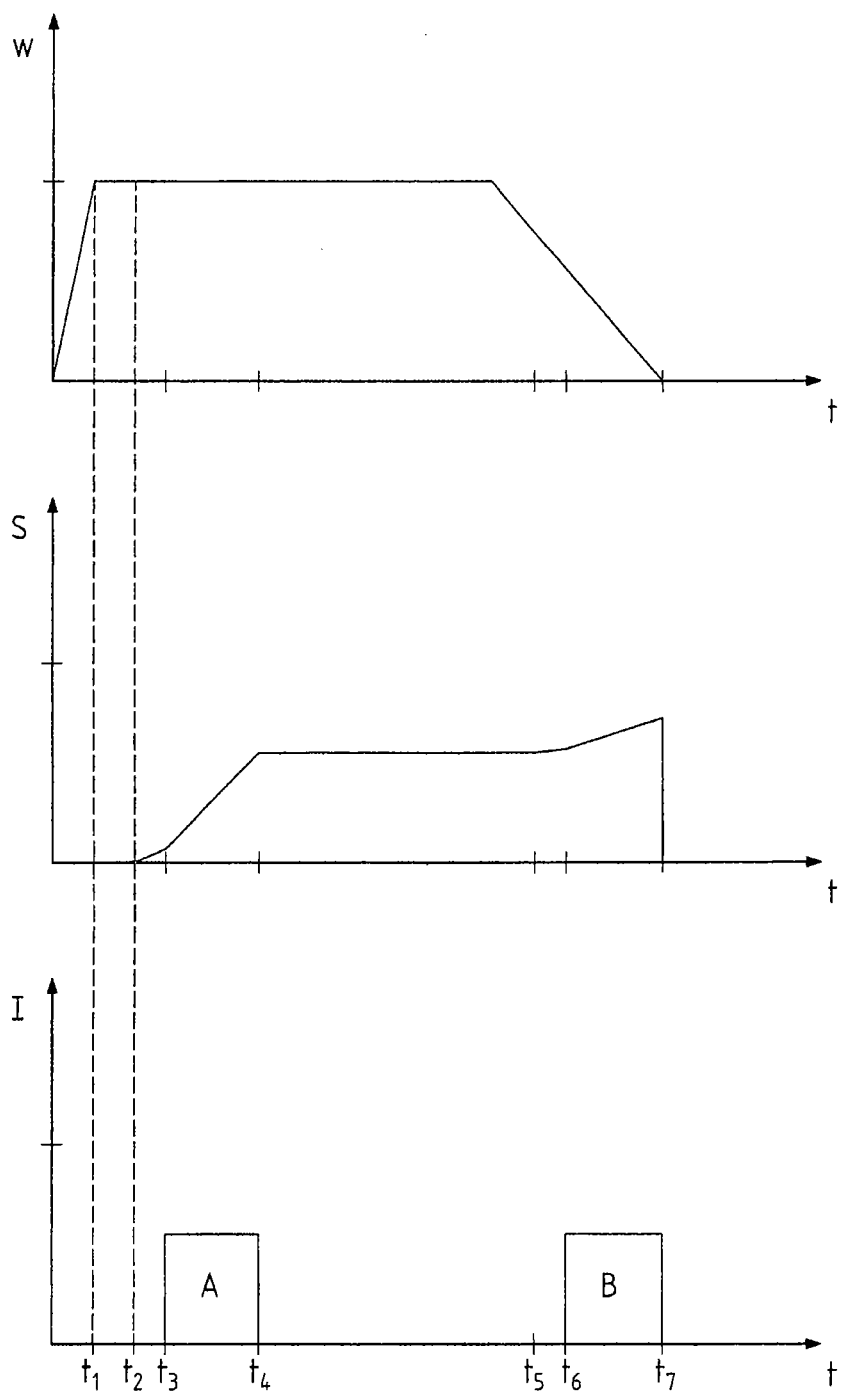

FIG. 3 now illustrates the temporal sequence of the parameters rotational speed ω, the penetration depth s of the joining element as well as the amperage I in accordance with a second exemplary embodiment of the method according to the invention. In this exemplary embodiment likewise a composite material consisting of an outer layer of metal 6, a plastic layer 5 and a further outer layer of metal 4 was welded, wherein the last layer of metal 4 was not penetrated.

At the beginning of the welding process the joining element 3 is set into rotation, until at the time-point $t_1$ the maximum rotational speed is reached. At the time-point $t_2$ the joining element 3 is moved towards workpiece 1. It can be seen that penetration into the work piece 1 takes place between $t_2$ and $t_3$ first at a relatively slow speed. At the time-point $t_3$, that is to say, during the translational movement towards workpiece 1, a current pulse A is induced. This assists the advance of the joining element 3 through the workpiece 1 and its first layer 6. Due to the greater softening of the material of the workpiece 1 during the current pulse A, the speed of advance can be increased or at constant speed the contact pressure can be reduced. At the time-point $t_4$ the current pulse A is switched off. The duration amounts to about 600 ms. Subsequently, the joining element is advanced starting from the time-point $t_5$ to the lower layer of metal 5 of the workpiece 1, which is reached at the time-point $t_6$. Only after contact with the lower layer 6, a current pulse is again induced between the time-points $t_6$ and $t_7$, the rotational movement of the joining element already being reduced. At the end of the welding process at the time-point $t_7$ the rotational movement of the joining element is stopped and the current pulse B is switched off The molten metal in the joining zone solidifies. After solidification a firmly-bonded connection is obtained between the joining element 3 and the layer of metal 4 of the workpiece 1.

Although the figures show the use of the method according to the invention for connecting a joining element to a workpiece consisting of a composite material, it is also possible to conceive using the method according to the invention with non-composite materials.

The invention claimed is:

1. Method for welding a first workpiece with a joining element, wherein the joining element and the first workpiece at least partially consist of a metal, the joining element rotates relative to the first workpiece during welding and at the same time is pressed in the axial direction against the first workpiece to form mechanical contact, wherein frictional heat is generated, characterized in that, during the mechanical contact of the joining element with the first workpiece, an electrical current is generated between workpiece and joining element and at least one current pulse is induced simultaneously with a movement of the joining element towards the first workpiece.

2. Method according to claim 1, wherein the joining element does not completely penetrate the first workpiece.

3. Method according to claim 1, wherein the first workpiece consists of a composite material with at least two different layers of material.

4. Method according to claim 1, wherein the first workpiece includes two outer layers of metal and at least one internal plastic layer.

5. Method according to claim 1, wherein that electrical current pulses of more than 10 A, are used.

6. Method according to claim 1, wherein rotational speeds of the rotating joining element are between 150 and 25000 rpm.

7. Method according to claim 5, wherein duration of the current pulses is between 10 ms and 2500 ms.

8. Method according to claim 1, wherein a stud with a truncated conical point is used as the joining element.

9. Method according to claim 8, wherein the point of the truncated conical point stud comprises an angle of 30° to 90°.

10. Method according to claim 1, wherein a second workpiece is joined by means of at least one joining element to the first workpiece.

11. Method according to claim 5, wherein electrical current pulses of between 100 A and 2500 A are used.

12. Method according to claim 6, wherein the rotational speeds of the rotating joining element are between 400 and 500 rpm.

13. Method according to claim 7, wherein duration of the current pulses is between 500 ms and 1000 ms.

14. Method according to claim 1, wherein at least one current pulse is induced immediately before friction movement of the joining element relative to the first workpiece stops.

* * * * *

UNITED STATES PATENT AND TRADEMARK OFFICE
CERTIFICATE OF CORRECTION

PATENT NO. : 8,461,484 B2  
APPLICATION NO. : 12/540900  
DATED : June 11, 2013  
INVENTOR(S) : Burkhard Tetzlaff et al.

Page 1 of 1

It is certified that error appears in the above-identified patent and that said Letters Patent is hereby corrected as shown below:

In the Claims:

Claim 12, column 6, line 22, replace --500 rpm-- with --5000 rpm--

Signed and Sealed this  
Thirteenth Day of August, 2013

Teresa Stanek Rea  
*Acting Director of the United States Patent and Trademark Office*